March 12, 1957
H. H. BALY
2,785,271
STEAM GENERATOR
Filed Oct. 8, 1953
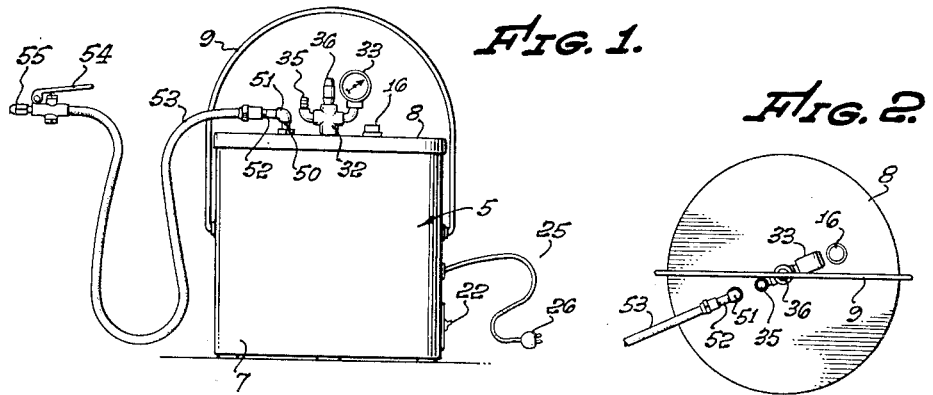
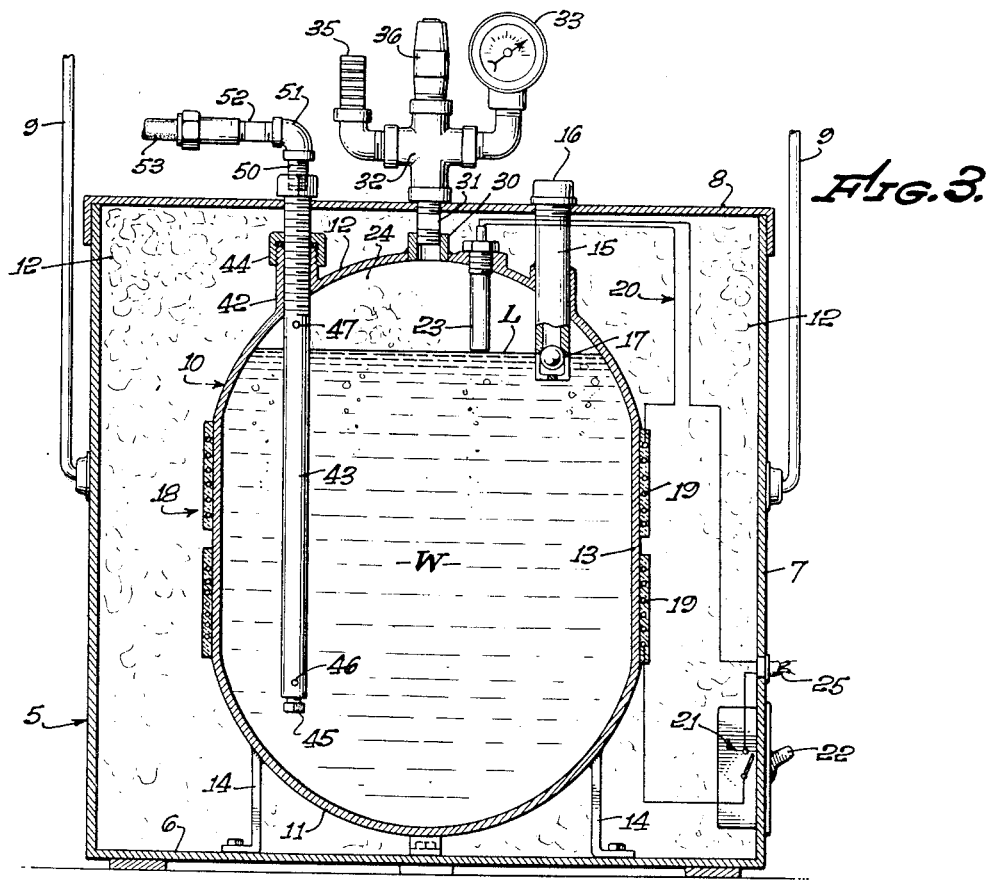
HAL H. BALY.
INVENTOR.
BY Reed C Lawlor
ATTORNEY.

United States Patent Office 2,785,271
Patented Mar. 12, 1957

2,785,271

STEAM GENERATOR

Hal H. Baly, Manhattan Beach, Calif.

Application October 8, 1953, Serial No. 384,930

14 Claims. (Cl. 219—38)

This invention relates generally to steam generators and particularly to a generator of the type commonly employed for supplying steam for cleaning purposes.

One object of the invention is to provide a steam generator of relatively small size, which is simple in construction, yet highly practical and efficient in performing its function.

Another object of the invention is to provide a steam generator, of the character referred to, which is so constructed that it will supply steam vapor of any desired degree of saturation.

Another object of the invention is to provide a steam generator of the type indicated which is capable of producing steam at a rapid rate and maintaining and supplying the produced steam at a substantially constant pressure.

Another object of the invention is to provide a steam generator having a closed vessel or boiler for containing a supply of water to be boiled, a heating means surrounding the vessel to heat the water, and a discharge pipe through which the generated steam flows to a dispensing nozzle.

Another object of the invention is to provide a steam generator, of the class referred to, employing a filler tube through which water is introduced into the vessel, said tube extending into the upper end of the vessel with its lower end so located as to allow filling of the vessel only to a prescribed level.

Another object of the invention is to provide a steam generator, of the class referred to, with a normally open float valve at the lower end of a filler tube through which water is introduced into the vessel so as to allow filling of the vessel only to a prescribed level.

Another object of the invention is to provide a steam generator in which the vessel is completely surrounded by a case or jacket, thermal insulation material being employed between the vessel and jacket to prevent heat losses and thereby increase the efficiency of the generator.

Another object of the invention is to provide a steam generator in which the heating means consists of an electrical heating element, the operation of which is controlled by a thermostat unit, located within the upper portion of the vessel to be responsive to changes in the temperature of the steam vapor generated above the surface of the water.

A further object of the invention is to provide a steam generator, of the character referred to, having a poppet type safety valve and a vent valve, the former being adapted to open at a relatively high pressure and the latter at a relatively low pressure so that air is expelled from the vapor space when steam is generated initially so that steam having a substantially uniform degree of saturation is available for use at all times regardless of the number of times that has been dispensed through the spray nozzle.

A further object is to provide a steam generator of the type specified which is compact, self-contained and portable to adapt it to be readily moved to selected locations for use or storage, the jacket having a bail or handle by which the generator may be carried.

Further objects of the invention will appear from the following description and from the drawing, which is intended for the purpose of illustration only, and in which:

Fig. 1 is a side elevational view of the improved steam generator, showing it applied to use in supplying steam to a spray nozzle;

Fig. 2 is a plan view of the steam generator; and

Fig. 3 is an enlarged vertical sectional view through the same.

Referring to the drawing in detail, my improved steam generator includes a case or jacket 5 having a bottom wall 6, a cylindrical wall 7 and an upper wall or cover 8. A bail or handle 9 is pivoted to opposite sides of the jacket 5 to facilitate carrying the generator to desired locations.

A closed vessel or boiler 10 is disposed within the jacket 5, the vessel having a hemispherical bottom portion 11, an upper hemispherical portion 12 and a cylindrical intermediate portion 13. The lower portion 11 is provided with feet 14 which are bolted to the bottom wall 6 of the jacket 5 to mount the vessel. The space occuring between the jacket 5 and vessel 10 is packed with a suitable thermal insulation material 12.

The vessel or boiler 10 is adapted to contain a quantity of water W which is introduced thereinto by way of a filler tube 15 having its lower end disposed within the vessel and its upper end located above the top 8 of the jacket or case 5 and provided with a removable cap 16. The lower end of the tube 15 is so located vertically that it limits the filling of the boiler to the level indicated at L. To be more specific, during the filling operation, the water level rises to eventually cause the water to seal off the lower end of the tube to trap air in the upper closed end of the boiler. Since the trapped air cannot be displaced, the introduction of additional water is impossible and overfilling of the boiler above the indicated level L is prevented. To preclude any possibility of overfilling, a normally open float valve 17 is located at the bottom end of the filler pipe 15.

The water W within the vessel or boiler 10 is heated to the temperature required to produce steam through the medium of a heating means 18 which consists of electrical heating elements 19 surrounding the vessel. The heating elements 19 are connected in an electrical circuit 20 which includes a switch 21 having an actuator in the form of a pivoted arm 22 projecting through the case 5. Also connected in the circuit 20 is a thermostat element 23 which extends downwardly into the upper portion 24 of the vessel 10, this portion being hereinafter referred to as the vapor chamber. As will be noted by reference to Fig. 3, the thermostat element 23, heating elements 19 and switch 21 are connected in series in the circuit 20 which also includes a two-wire cable 25 provided with a plug element 26 by which the circuit can be connected to a source of electric current at a convenience outlet.

Screwed into a threaded boss 30 in the top of the vessel or boiler 10 is the lower end or nipple 31 of an X-fitting 32. Connected to one lateral branch of this fitting is a pressure gauge 33. A vent valve 35 is connected to the other lateral branch of the fitting 32. Screwed into the upper branch of the fitting is a safety valve 36 of the common poppet type. Since the valves 35 and 36 are conventional, they are not shown in detail. Suffice it to state that the vent valve 35 is set to close when the pressure of vapor within the upper end of the vessel 10 increases to a predetermined pressure of approximately 14 p. s. i., while the safety valve 36 is set to close when the pressure increases to a pressure of approximately 100 p. s. i.

Screwed downwardly through a threaded boss 42 at the upper end of the boiler 10 is a standpipe or discharge pipe 43, a packing gland means 44 being employed for sealing the joint at the boss. The lower end of the pipe 43 is closed by a plug 45 and is located adjacent the lower end of the vessel. The pipe 43 is provided with small holes 46 and 47 located respectively adjacent its lower end and at a level immediately above the level L of the water.

A nipple 50 is screwed into the upper exposed end of the discharge pipe 43 and carries an L fitting 51 to which a lateral nipple 52 is connected. One end fitting of a hose 53 is connected to the nipple 52. At its opposite end, the hose 53 carries a control valve 54 and a spray nozzle 55, these parts being of conventional types.

To prepare the steam generator for operation, water is introduced into the vessel 10 through the filler tube 15 and during this filling operation air is expelled through the filler tube and also through the vent valve 35. Eventually, the level of the water W rises to a point where it closes the valve 17 to seal the lower end of the filler tube and to trap air in the upper end of the vessel and to prevent introduction of additional water. A vapor chamber 24 is thus formed in the upper end of the vessel 10. In case no shut off valve 17 is employed, the orifice of the vent valve 35 is made so small that air flows out so slowly that the filling of the vessel to the level L is indicated by accumulation of water in the filler tube 15. In either event when sufficient water has been added, the cap 16 is screwed onto the upper end of the filler tube 15.

The electric heating elements 19 are now energized by closing the switch 21. As the temperature of the water rises, it expands and the air within the space or chamber 24 is compressed. Due to the rising temperature within the vessel, the vapor in the chamber 24 is pressurized and discharges through the relief valve 35 forcing the trapped air out of the chamber. When the vapor pressure reaches 14 p. s. i., the vent valve closes, trapping dry steam that is substantially free of air in the vapor space 24.

As heating of the water is continued, steam pressure is developed at a rapid rate and quickly reaches an operating pressure of approximately 85 p. s. i. The heating elements 19 operate to maintain this pressure, the thermostat being set at 298° F., corresponding to 85 p. s. i. vapor pressure. Should the steam pressure reach 100 p. s. i., in the event of failure of the thermostat, the safety valve 36 will open to relieve this pressure. The regulation of the water temperature is very accurate by virtue of the mounting of the thermostat in the vapor space. This is probably due to the fact that the expansion and compression of the vapor causes the temperature of the vapor to vary over a wider amplitude and hence more rapidly than the temperature of the water.

The steam available within the vessel or boiler 10 is ready for cleaning various articles, such as refrigerators, typewriters and other devices. To clean the article, the valve 54 is opened to cause the steam to be discharged through the nozzle 55. Ordinarily the nozzle is not opened until after the pressure has attained its equilibrium value of 85 p. s. i. However it may be opened to supply steam for cleaning purposes at a much lower pressure such as about 70 p. s. i.

When the valve 54 is opened, the pressure within the upper portion of the discharge pipe 43, above the water level L, is relieved, steam entering this pipe through the upper orifice or orifices 47. The excess pressure within the chamber 24 also forces water into the pipe 43 through the bottom orifice or orifices 46 thus causing the column of water in the discharge pipe to rise therein.

Initially at least, the water in this column tends to boil because of the fact that the pressure in the standpipe is lower than the pressure in the vapor space. But in any event the dry steam entering the upper orifice agitates and aspirates water at the top of the column, in effect atomizing it and forming wet steam in the standpipe 43 and hose 53.

The rate of influx of steam from the vapor space 24 into the interior of the discharge pipe 43 is determined by the size and number of the upper holes 47. Likewise, the rate of influx of water to the interior of the pipe 43 is determined by the size and number of the lower holes 46. As a result of the co-action of the upper and lower perforations 47 and 46 partially saturated or wet steam enters the discharge pipe and is expelled through the nozzle 54 when the nozzle is opened.

If the lower end of the discharge pipe were to terminate above the water level L, dry steam would be produced and if the pipe were provided only with the lower perforations 46, then very wet steam would be produced. By employing two sets of perforations, one above and one below the water level, partially saturated steam is produced. The perforations 47, 46 may have diameters of approximately $\frac{1}{16}$ inch. In order to adjust the steam generator to produce steam having different degrees of saturation, interchangeable discharge pipes having a greater or lesser number of perforations 47 and 46, or both, and of varying sizes, may be substituted for the pipe 43 illustrated in the drawing.

It is thus seen that the present steam generator is highly practical and efficient in use. The generator is of a portable type, weighing approximately forty-five pounds when empty and about sixty-three pounds when containing a full supply of water. By controlling the degree of saturation of the steam, the device can be used for cleaning various types of objects. The generator is designed to attain equilibrium rapidly and to produce steam at a rapid rate and to effectively maintain the pressure at a suitable high value.

In accordance with the provisions of the patent statues, I have described the principle of the invention, together with the construction of the steam generator which I now consider to represent the best embodiment thereof. I wish to have it understood, however, that the invention may be embodied in other forms within the scope of the appended claims.

I claim as my invention:

1. A steam generator including a vessel for containing water; a jacket surrounding the vessel; insulation material between the vessel and jacket; electrical heating elements surrounding the vessel; an electrical circuit for the heating elements; a thermostat element including a switch connected in said circuit, said thermostat element being responsive to temperature of fluid within the vessel; and a discharge pipe extending into the vessel to a point near the bottom of said vessel and beneath the normal water level therein and having at least one hole through which fluid within the vessel can enter the pipe in liquid form to be discharged exteriorly of the vessel.

2. A steam generator including a vessel for containing water; a jacket surrounding the vessel; insulation material between the vessel and jacket; electrical heating elements surrounding the vessel; an electrical circuit for the heating elements; a thermostat element including a switch connected in said circuit; a discharge pipe extending into the vessel and having at least one hole through which fluid within the vessel can enter the pipe in liquid form to be discharged exteriorly of the vessel; and filler means by which water can be introduced into the vessel, said filler means being operative to prevent filling above a predetermined level, the space between the water level and the upper end of the vessel constituting a vapor chamber, said thermostat element being disposed within said vapor chamber and being responsive to the temperature of vapor within said vapor chamber.

3. A steam generator including a vessel for containing water; a jacket surrounding the vessel; insulation material between the vessel and jacket; electrical heating elements surrounding the vessel; an electrical circuit for the heating elements; a thermostat element including a switch connected in said circuit; a discharge pipe extending into the vessel and having at least one hole through which fluid within the vessel can enter the pipe in liquid form to be discharged exteriorly of the vessel; and filler means by which water can be introduced into the vessel, said filler means being operative to prevent filling above a predetermined level, the space between the water level and the upper end of the vessel constituting a vapor chamber, said heating elements being mounted beneath said level, and said thermostat element being disposed within said vapor chamber and being responsive to the temperature of vapor within said vapor chamber.

4. A steam generator including a vessel for containing water; a jacket surrounding the vessel; insulation material between the vessel and jacket; electrical circuit for the heating elements; a thermostat element including a switch connected in said circuit, said thermostat element being responsive to the temperature of fluid within the vessel; a discharge pipe extending into the vessel and having at least one hole through which fluid within the vessel can enter the pipe in liquid form to be discharged exteriorly of the vessel; filler means by which water can be introduced into the vessel, said filler means being operative to prevent filling above a predetermined level above said hole, the space between the water level and the upper end of the vessel constituting a vapor chamber; a safety valve communicating with said chamber and set to open at a relatively high vapor pressure; and a vent valve communicating with said chamber and set to open at a relatively low vapor pressure but above atmospheric pressure.

5. A steam generator including a vessel for containing water; a jacket surrounding the vessel; insulation material between the vessel and jacket; electrical heating elements surrounding the vessel; an electrical circuit for the heating elements; a thermostat element including a switch connected in said circuit; a discharge pipe extending into the vessel and having at least one hole through which fluid within the vessel can enter the pipe in liquid form to be discharged exteriorly of the vessel; filler means by which water can be introduced into the vessel, said filler means being operative to prevent filling above a predetermined level, the space between the water level and the upper end of the vessel constituting a vapor chamber, said thermostat element being disposed within said chamber and being responsive to the temperature of vapor within said vapor chamber; a safety valve communicating with said chamber and set to open at a relatively high vapor pressure; and a vent valve communicating with said chamber and set to open at a relatively low vapor pressure but above atmospheric pressure.

6. A steam generator including a vessel for containing water; a jacket surrounding the vessel; insulation material between the vessel and jacket; electrical heating elements surrounding the vessel; an electrical circuit for the heating elements; a thermostat element including a switch connected in said circuit; a discharge pipe extending into the vessel and having at least one hole through which fluid within the vessel can enter the pipe in liquid form to be discharged exteriorly of the vessel; filler means by which water can be introduced into the vessel, said filler means being operative to prevent filling above a predetermined level, the space between the water level and the upper end of the vessel constituting a vapor chamber; a safety valve communicating with said chamber and set to open at a relatively high vapor pressure; and a vent valve communicating with said chamber and set to open at a relatively low vapor pressure but above atmospheric pressure; said thermostat being disposed within said vapor chamber and being responsive to the temperature of vapor within said chamber and being set to maintain the temperature of the vapor in said chamber at a temperature corresponding to a vapor pressure between said relatively high pressure and said relatively low pressure.

7. A steam generator including a vessel for containing water; a jacket surrounding the vessel; insulation material between the vessel and jacket; electrical heating elements surrounding the vessel; an electrical circuit for the heating elements; a thermostat element including a switch connected in said circuit, said thermostat element being responsive to the temperature of fluid within the vessel; filler means by which water can be introduced into the vessel, said filler means being operative to prevent filling above a predetermined level, the space between the water level and the upper end of the vessel constituting a vapor chamber; a safety valve communicating with said chamber and set to open at a relatively high vapor pressure; a vent valve communicating with said chamber and set to open at a relatively low vapor pressure but above atmospheric pressure; and a discharge pipe extending into the vessel from the upper end thereof and to a depth beneath said predetermined level, said discharge pipe having at least one hole disposed within said vapor chamber through which steam can enter said discharge pipe from said chamber.

8. A steam generator including a vessel for containing water; a jacket surrounding the vessel; insulation material between the vessel and jacket; electrical heating elements surrounding the vessel; an electrical circuit for the heating elements; a thermostat element including a switch connected in said circuit, said thermostat being responsive to the temperature of fluid within the vessel; filler means by which water can be introduced into the vessel, said filler means being operative to prevent filling above a predetermined level, the space between the water level and the upper end of the vessel constituting a vapor chamber; a safety valve communicating with said vapor chamber and set to open at a predetermined relatively high vapor pressure; a vent valve communicating with said chamber and set to open at a relatively low vapor pressure but above atmospheric pressure; and a discharge pipe extending into the vessel, said discharge pipe having at least one hole disposed within said vapor chamber through which steam can enter said discharge pipe from said chamber, said discharge pipe also having at least one hole beneath said water level through which water can enter said discharge pipe.

9. A steam generator including a vessel for containing water; a jacket surrounding the vessel; insulation material between the vessel and jacket; electrical heating elements surrounding the vessel; an electrical circuit for the heating elements; a thermostat element including a switch connected in said circuit, said thermostat being responsive to the temperature of fluid within the vessel; filler means by which water can be introduced into the vessel, said filler means being operative to prevent filling above a predetermined level, the space between the water level and the upper end of the vessel constituting a vapor chamber; a safety valve communicating with said vapor chamber and set to open at a relatively high predetermined vapor pressure; a vent valve communicating with said chamber and set to open at a relatively low vapor pressure but above atmospheric pressure; and a discharge pipe extending into the vessel from the upper end thereof, said discharge pipe having at least one hole disposed within said vapor chamber through which steam can enter said discharge pipe from said chamber, said discharge pipe extending downwardly into the supply of water and also having at least one hole adjacent its lower end through which water can enter said discharge pipe.

10. A stream generator including a vessel for containing water; a jacket surrounding the vessel; insulation material between the vessel and jacket; filler means by which water can be introduced into the vessel, said filler means being operative to prevent filling above a predetermined level, the space between the water level and the upper end of the vessel constituting a vapor chamber; electrical heating elements surrounding the vessel beneath said water level; an electrical circuit for the heating elements; a safety valve communicating with said vapor chamber and set to open at a relatively high vapor pressure; a vent valve communicating with said vapor chamber and set to open at a relatively low vapor pressure but above atmospheric pressure; a thermostat element including a switch connected in said circuit, said thermostat element being disposed within said vapor chamber and being responsive to the temperature of vapor within the chamber, and being set to maintain the temperature of the vapor in said space at a temperature corresponding to a vapor pressure between said relatively high pressure and said relatively low pressure; and a discharge pipe extending into the vessel from the upper end thereof, said discharge pipe having at least one hole disposed within said vapor chamber through which steam can enter said discharge pipe from said chamber, said discharge pipe extending downwardly into the supply of water and also having at least one hole adjacent its lower end through which water can enter said discharge pipe.

11. A steam generator including: a vessel for holding a liquid, means for insulating the vessel from the atmosphere, means extending into the vessel for introducing the liquid into the vessel and for limiting the level of the liquid in the vessel, means for heating the liquid within the vessel to produce a vaporization of liquid into the space between the liquid level and the top of the vessel, and a discharge pipe extending from a position above the vessel through the vessel to a position below the level of the liquid, there being a first plurality of holes in the pipe at a position above the liquid level to produce movement of vapor through the pipe, there being a second plurality of holes in the pipe at a position below the liquid level to produce a movement of liquid through the pipe for aspiration by the vapor, the number and size of the holes in the second plurality being chosen relative to the number and size of the holes in the first plurality to control the saturation of the vapor passing through the pipe.

12. A steam generator, including: a vessel for holding a liquid, means for insulating the vessel from the atmosphere, means extending into the vessel for introducing the liquid into the vessel to a particular level in the vessel, means for heating the liquid within the vessel to produce a vaporization of liquid into the space between the liquid level and the top of the vessel, a vent valve for passing air and vapor out of the vessel at pressures below a first particular value in the space of vaporization, a safety valve for passing vapor out of the vessel at pressures above a second particular value in the space of vaporization, the second particular value of pressure being greater than the first particular value of pressure, and a discharge pipe communicating at one end with the atmosphere and at the other end with the liquid in the vessel for guiding vapor out of the vessel, there being at least a first hole in the discharge pipe at a position within the vessel and above the liquid level to receive the vapor for movement through the pipe, there being at least a second hole in the discharge pipe at a position within the vessel and below the liquid level to receive the liquid for aspiration by the vapor and for movement through the pipe, the holes in the discharge pipe below the water level being of a number and size relative to the holes in the discharge pipe above the water level to control the relative saturation of the vapor passing through the pipe.

13. A steam generator, including: a vessel for holding a liquid, means for insulating the vessel from the atmosphere, means extending into the vessel for introducing the liquid into the vessel and for limiting the level of the liquid in the vessel, the space between the liquid level and the upper end of the vessel constituting a vapor chamber, means for heating the liquid to produce a vaporization of the liquid into the vapor chamber, a thermostat disposed in the vapor chamber for controlling the operation of the heating means for temperatures above a particular value, and a discharge pipe communicating at one end with the atmosphere and at the other end with the liquid at a position below the liquid level to provide a passage for vapor out of the vessel, there being at least a first opening in the discharge pipe at a position within the vessel and above the liquid level to receive vapor from the chamber, there being at least a second opening in the discharge pipe at a position within the vessel and below the liquid level to receive liquid from the chamber for aspiration by the vapor passing through the pipe, the first openings being of such a size relative to the second openings as to control the saturation of the vapor passing through the pipe.

14. A steam generator, including: a vessel for holding a liquid, means for insulating the vessel from the atmosphere, means extending into the vessel for introducing the liquid into the vessel and for limiting the level of the liquid in the vessel, the space between the water level and the upper end of the vessel constituting a vapor chamber, means for heating the liquid to produce a vaporization of the liquid into the vapor chamber, a thermostat disposed in the vapor chamber for controlling the operation of the heating means for temperatures above a particular value, a vent valve for passing air and vapor out of the vessel at pressures below a first particular value in the vapor chamber to exhaust air from the chamber, a safety valve for passing vapor out of the vessel at pressures above a second particular value in the vapor chamber, the second particular value of pressure being greater than the first particular value of pressure, and a discharge pipe extending from a position above the vessel through the vessel to a position below the level of the liquid, there being a first plurality of holes in the pipe at a position above the liquid level to provide a passage of vapor out of the vessel, there being a second plurality of holes in the pipe at a position below the liquid level to produce a movement of liquid through the pipe for aspiration by the vapor, the number and size of the holes in the second plurality being chosen relative to the number and size of the holes in the first plurality to control the saturation of the vapor passing through the pipe.

References Cited in the file of this patent

UNITED STATES PATENTS

| | | |
|---|---|---|
| 1,775,122 | Emerson | Sept. 9, 1930 |
| 1,866,221 | Pennington | July 5, 1932 |
| 1,932,447 | Caplan | Oct. 31, 1933 |
| 1,995,814 | Parker | Mar. 26, 1935 |
| 2,277,895 | Willat | Mar. 31, 1942 |
| 2,291,423 | Tiscornia | July 28, 1942 |
| 2,478,370 | Clark et al. | Aug. 9, 1949 |
| 2,627,015 | Hackman | Jan. 27, 1953 |
| 2,639,365 | Krampe et al. | May 19, 1953 |